United States Patent
Shiley et al.

[15] 3,659,612
[45] May 2, 1972

[54] TRACHEOSTOMY TUBE

[72] Inventors: Donald P. Shiley, Santa Ana; Bruce E. Fettel, Diamond Bar, both of Calif.

[73] Assignee: Donald P. Shiley, Santa Ana, Calif.

[22] Filed: Nov. 12, 1970

[21] Appl. No.: 88,591

Related U.S. Application Data

[63] Continuation-in-part of Ser. No. 863,229, Oct. 2, 1969.

[52] U.S. Cl. ............................................. 128/351, 128/208
[51] Int. Cl. ............................... A61m 25/02, A61b 17/24
[58] Field of Search .................... 128/208, 349 B, 351; 251/7

[56] References Cited

UNITED STATES PATENTS

| | | | |
|---|---|---|---|
| 3,334,631 | 8/1967 | Stebleton | 128/351 |
| 3,438,375 | 4/1969 | Ericson | 128/349 B |
| 3,460,541 | 8/1969 | Doherty | 128/351 |
| 3,481,339 | 12/1969 | Puig | 128/351 |
| 2,643,848 | 6/1953 | Hoffmann | 251/7 X |
| 3,363,629 | 1/1968 | Kuhn | 128/351 |
| 3,565,079 | 2/1971 | Jackson | 128/351 |

FOREIGN PATENTS OR APPLICATIONS 693,510  7/1953  Great Britain .......................... 128/351

OTHER PUBLICATIONS

The Lancet, Jan. 7, 1956, page 26

*Primary Examiner*—Channing L. Pace
*Attorney*—Fowler, Knobbe & Martens

[57] ABSTRACT

A tracheostomy tube for insertion into the trachea to support breathing having a concave sealing balloon which, when inflated, assumes a cylindrical shape and therefore forms a seal between the cannula and the trachea over an extended axial length, the tracheostomy tube also incorporating an inner cannula which is disposed within and throughout the entire length of the outer cannula and is connected to the outer cannula by a removable fitting which assures a pneumatic seal between the two cannulas, the tracheostomy tube also including a rotatable connector which allows attachment to respiration support equipment in a variety of angular positions. The portion of the tracheostomy tube which extends outside of the patient is hinged to a swivel neck flange which makes the tube adaptable to various anatomies. The tube leading to the sealing balloon is controlled by an isolation valve outside of the patient which allows quick sealing and releasing of the pressure within the sealing balloon.

15 Claims, 10 Drawing Figures

INVENTORS  
DONALD P. SHILEY  
BRUCE E. FETTEL  
BY  
FOWLER, KNOBBE  
& MARTENS  
ATTORNEYS.

Patented May 2, 1972

INVENTORS.
DONALD P. SHILEY
BRUCE E. FETTEL
BY
FOWLER, KNOBBE
& MARTENS
ATTORNEYS.

INVENTORS.
DONALD P. SHILEY
BRUCE E. FETTEL
BY FOWLER, KNOBBE
& MARTENS
ATTORNEYS.

TRACHEOSTOMY TUBE

RELATED APPLICATIONS

This is a continuation-in-part of patent application Ser. No. 863,229, filed Oct. 2, 1969, for Tracheostomy Tube.

This invention relates to tracheostomy tubes and, in particular, to a tracheostomy tube which is designed to facilitate easy removal of obstructions within the tube and to minimize irritation of the trachea.

Tracheostomy tubes have been used to circumvent tracheal obstructions or to provide direct access to the trachea for forced respiration, either by inserting the tube through the patient's mouth and past the obstruction, or by inserting a similar tube through an incision in the patient's neck into the trachea. Prior tracheostomy tubes have caused a considerable amount of discomfort to the patient and infections in the trachea due to their failure to adjust to a given patient's anatomy and the means used for sealing the cannula of the trachea tube within the trachea. These tubes had an abrupt curvature which fit the trachea poorly, and depended on a toroidal balloon for the cannula to trachea seal, which toroidal balloon required substantial pressure on the inner tracheal wall. As a consequence of this discomfort patients who were forced to use such a device for a prolonged period of time in some cases suffered permanent tracheal damage.

In addition, connection of prior tracheostomy tubes to machines designed to assist respiration has involved the placement of respirator tubing and similar equipment in positions which not only brought discomfort to the patient but required inconvenient placement of the respirator equipment itself. Furthermore, connection of some of the previous tracheostomy tubes to respirator equipment has been accomplished through a connection to the outer cannula. This permits hospital personnel to remove the inner cannula completely and still use artificial respirator equipment. Since the inner cannula is used to remove obstructions from the tracheostomy tube without the complete removal of the tube itself, any such use of the tracheostomy tube without the inner cannula in place may result in a clogged outer cannula requiring removal of the complete tracheostomy assembly for cleaning. Likewise, to adequately clean the outer cannula, it is important that the inner cannula be aligned to run the entire length of the outer cannula, but not extend substantially beyond the outer cannula, since removal and insertion of an extending inner cannula would cause abrasion of the trachea and damage to the delicate cilia along the inner tracheal wall. Prior means of connecting the inner and outer cannulas did not assure such alignment.

In addition prior art devices have not provided a conveniently operable means for sealing the tube to maintain the toroidal balloon fully inflated. Therefore, since the pressure which is applied to the sealing balloon must be held within a restricted range, and since these seals are normally inflated through the use of a hypodermic syringe, it has been very difficult to accurately inflate the seal.

The present invention provides a novel tracheostomy tube which is readily adaptable to a variety of patient anatomies, and which eliminates many of the problems of prior art tracheostomy tubes. It allows connection to respirator devices from a variety of angular positions and permits connection of artificial respirator devices to the tracheostomy tube only when the inner cannula has been inserted. This latter feature of the present tracheostomy tube requires the use of a seal between the inner and outer tracheostomy tubes so that respiration pressure from an artificial respiration machine is not lost by leakage at this point. This enables accurate measurement of patient oxygen intake and administration of precise dosage of medicaments to the patient.

The present tracheostomy tube also includes a novel sealing balloon on the outer cannula which is constructed so that in the inflated condition it presents an extended cylindrical rather than toroidal sealing surface for contacting the inner wall of the trachea. This extended surface allows an adequate seal to be formed between the tracheostomy tube and the trachea without applying excessive pressure, and therefore without risking damage to the trachea.

The tracheostomy tube of this invention provides a means for accurately axially spacing a removable inner cannula within an outer cannula after the outer cannula has been inserted into the trachea without removal of the outer cannula.

While prior art tracheostomy tubes have been firmly attached to a neck flange which was strapped to the neck of the patient, the present device incorporates a hinged neck flange which allows the tracheostomy tube to be properly inserted into the trachea while still supported by a neck flange adaptable to a variety of patient anatomies.

To facilitate inflation of the sealing balloon, a simple snap or pinch valve has been devised for use in place of more complicated valves in prior art devices. This valve allows quick sealing of the pneumatic tube which is connected to the sealing balloon and therefore enhances the accuracy of proper filling of this balloon. The valve is integrally connected to an inflation tubing and can easily be manipulated with one hand.

With this general description of the invention in mind, a thorough understanding of the present tracheostomy tube is best achieved by reference to the drawings in which.

Figure 1:
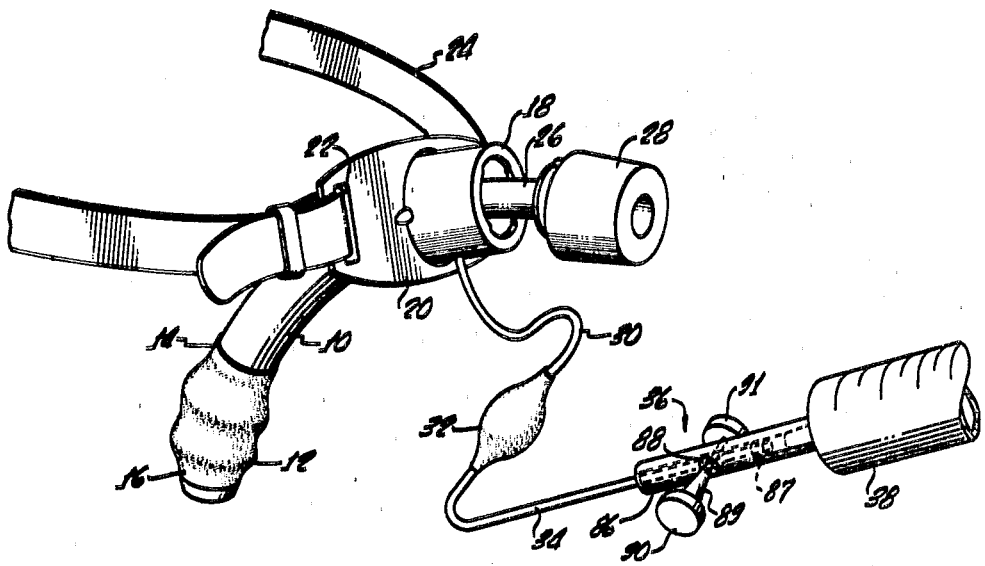
FIG. 1 is a perspective view of the tracheostomy tube assembly with the inner cannula partially removed and with a neck strap attached to the hinged flange.

Referring first to FIG. 1, the basic structural components of the present invention may be described. The outer cannula 10 is in the form of a semi-rigid, thin walled tube which is curved through approximately a 70° arc between its ends. Near one end of this tube is mounted a coaxial, concave, inflatable sealing balloon 12 which is shown in its deflated condition. The ends 14 and 16 of this sealing balloon 12 are attached and sealed to the outer cannula 10. The other end of the outer cannula 10 is firmly attached to a cylindrical connector 18, which in turn rotatably mounts a swivel neck flange 20, which is free to rotate through a limited arc about a horizontal axis. The swivel neck flange 20 has slots 22 at each of its ends for receiving a neck strap 24. The swivel neck flange 20 and the neck strap 24 are used to secure the entire device to the neck of the patient by holding the neck flange 20 flush against the neck proximate the incision through which the outer cannula 10 passes into the trachea.

Into the outer cannula 10 is inserted an inner cannula 26 which, like the outer cannula 10, is a semi-rigid, thin walled, hollow tube which is curved through approximately a 70° arc from one end to the other. This inner cannula 26 is approximately the same length as the outer cannula 10, such that when fully inserted into the outer cannula 10 the ends of the inner cannula 10 and the outer cannula 26 will be flush, or the inner cannula will extend beyond the outer cannula by a very small amount not exceeding about one thirty-second of an inch.

Rotatably mounted on one end of the inner cannula 26 is an axially tapered, cylindrical connector 28, constructed to matingly engage with the cylindrical connector 18 and, when fully engaged, to form a pneumatic seal between the inner cannula 10 and the outer cannula 26. The outer end of the connector 28 is usually tapered to form a frusto-conical configuration bored fitting for connection with respiration support equipment.

The sealing balloon 12 is pressurized through an axially extending passageway 40 in the wall of the outer cannula (see FIG. 2) through which a flexible inflation tube 30 extends. This tube is in turn connected through an inflatable indicator bulb 32 to another flexible inflation tube 34 which passes through a tube constricting pinch valve 36. The sealing balloon 12 may be pressurized by inserting a hypodermic syringe 38 into the end of the tube 34 or into an enlarged opening in the valve 36, as will be discussed, with the valve 36 in its open condition. By forcing air into the tube 34 with the hypodermic syringe 38, both the sealing balloon 12 and the indicator bulb 32 may be inflated. The valve 36 may now be closed and the hypodermic syringe 38 removed, leaving the sealing balloon 12 and the indicator bulb 32 inflated. Any leak in the pressurized system which causes the sealing balloon 12 to deflate will, in turn, cause the indicator bulb 32 to deflate, providing a visible indication outside of the patient of this problem. The tube 34 may have one end bonded to the valve 36, or may pass through the valve 36 for insertion of the inflation device into the tube.

Figure 2:
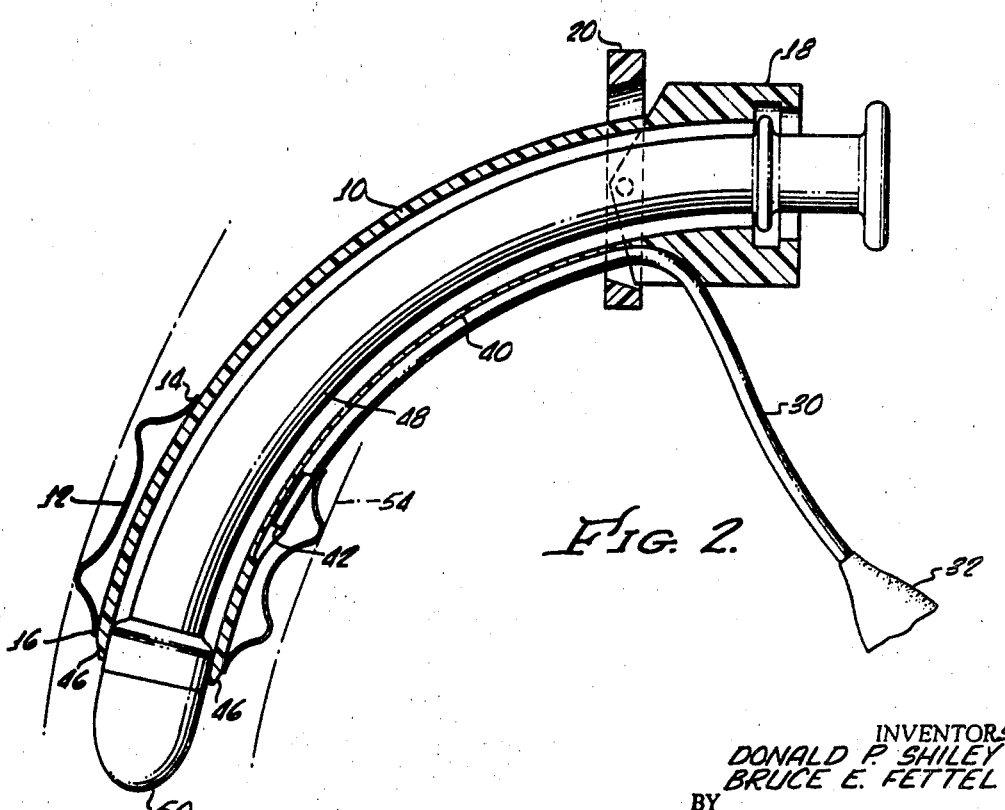
FIG. 2 is a vertical section of the outer cannula of the tracheostomy tube with the obturator fully inserted.

Referring now to FIG. 2, the details of the outer cannula 10 and the sealing balloon 12 may be explained. The outer cannula 10 in addition to its large central bore, as discussed, has a small diameter, axially extending tubular passageway 40 in one wall through which the tube 30 extends. This tubular passageway 40 opens at one end 42 into the cavity within the sealing balloon 12. The other end of the tubular passageway 40 may open onto an axially offset cylindrical bore 44 within the connector 18. This cylindrical bore 44 receives the tube 30 for permanent attachment to the connector 18. The tubular passageway 40 therefore allows pneumatic pressure variations to be transmitted through the tube 30 into the chamber enclosed by the sealing balloon 12 for inflation of the balloon and sensing of balloon deflation.

The distal end 46 of the outer cannula 10 is chamfered to allow a fairly smooth surface continuation of the outer cannula 10 to a stylette or obturator 48. The obturator 48 is also curved through approximately a 70° angle and is constructed of rigid polymer material. The obturator 48 is inserted within the outer cannula through the bore of the connector 18 in order to present a blunt, rounded end 50 to facilitate insertion of the outer cannula 10 into the trachea. During such insertion, the sealing balloon 12, which is deflated, is free to collapse almost completely against the outer wall of the outer cannula 10. Therefore, the projection of the outer cannula 10 and the sealing balloon 12, the chamfered end 46 of the outer cannula 10, and the obturator 48, as a unit, into the trachea may be accomplished without gouging or cutting the tracheal tissue with any sharp edges. Once the assembly has been inserted into the trachea, the obturator 48 may be withdrawn from the outer cannula 10, providing a passageway through the hollow bore of the outer cannula 10 from the inside of the trachea to the connector 18.

The sealing balloon 12 is a flexible polymer impermeable membrane which, in its deflated or relaxed condition shown in FIG. 2, assumes the shape of a cylinder with concave walls. The ends 14 and 16 of this cylinder extend outwardly from and are attached to the outer wall of the outer cannula 10. Due to the concave walls, the sealing balloon 12 assumes the shape of a straight-walled cylinder when properly inflated (see FIG. 3). Previous tracheostomy tubes had sealing balloons which assumed a toroidal shape when inflated, and therefore relied upon a relatively high pressure at the point of contact of the toroid with the trachea to form an adequate seal. By utilizing a cylindrical shape, a low pressure seal may be achieved with the trachea, since the seal extends over an extended axial length of the trachea. Such a distribution of pressure axially along the inner wall of the trachea reduces necrosis of the inner tracheal tissue which might lead to tracheal stenosis.

Figure 3:
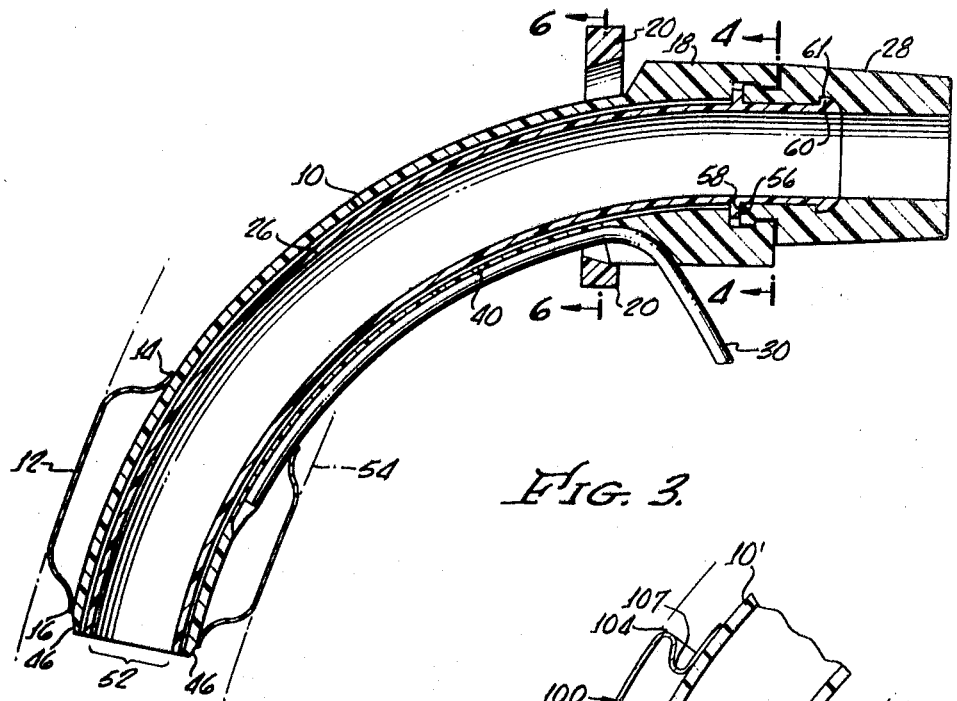
FIG. 3 is a vertical section through the outer cannula with the inner cannula fully inserted and the sealing balloon properly inflated.

Referring now to FIG. 3, the use and placement of the inner cannula 26 may be described. After the outer cannula is in place and the obturator 48 has been removed, the inner cannula 26 is gently inserted axially into the bore of the outer cannula 10. Since the inner and outer cannula 10 and 26 are curved at only 70°, this insertion is appreciably easier than with the previous 90° angles, since in both cases the tubes are semi-rigid and may occasionally have some tendency to bind if the person putting the inner cannula in place is not careful. Likewise, the 70° arc is better adapted to alignment with the trachea walls of most patients and therefore avoids distortion of the trachea.

When fully inserted, the distal end 52 of the inner cannula should fit flush with the distal end 46 of the outer cannula, as shown in FIG. 3, or may extend slightly beyond the distal end 46 of the outer cannula. Since the purpose of the inner cannula 26 is to allow removal of collected phlegm and mucous from the bore of the outer cannula 10, it is significant that the inner cannula 26 extend throughout the length of the outer cannula 10, but not extend substantially beyond the outer cannula 10. Any substantial extension beyond the outer cannula 10 would irritate the tracheal wall on insertion and removal of the inner cannula 26. If the inner cannula 26 does not extend at least the length of the outer cannula, obstructions at the distal end 46 of the outer cannula may not be removed with the inner cannula.

With continued reference to FIG. 3, the connector 28 is shown in its fully inserted position forming a seal between the abutting face 56 of the connector 28 and the face 58 of the inner cannula 26. This seal stops air from flowing between the inner cannula 26 and the outer cannula 10 and therefore restricts the passage of air into the trachea to that which passes through the central bore of the inner cannula 26. The upper end of the inner cannula 26 carries an annular shoulder 60 which fits rotatably within an annular recess 61 on the inner periphery of the tapered cylindrical connector 28. This permits the connector 28 to be rotated into the connector 18 without rotating the inner cannula 26.

Figure 4:
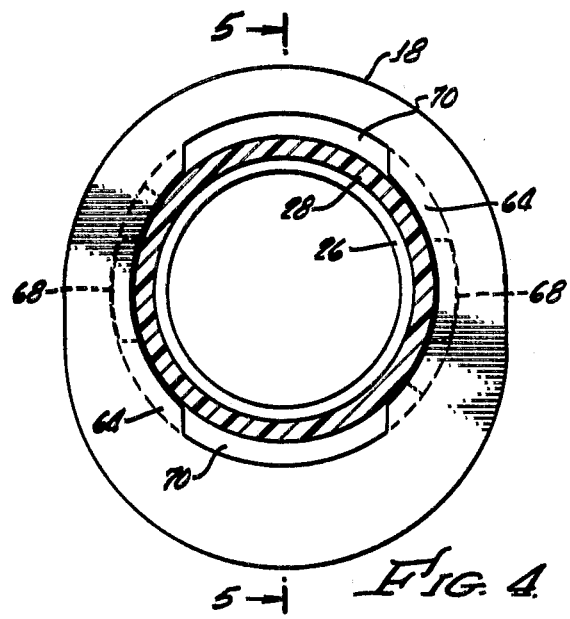
FIG. 4 is a sectional view taken substantially along line 4—4 of FIG. 3 showing the sealing coupling between the inner and outer cannulas.
Figure 5:
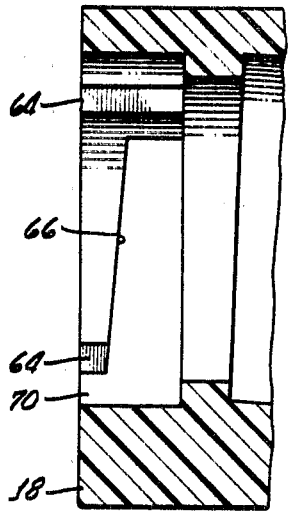
FIG. 5 is a sectional view taken substantially along line 5—5 of FIG. 4 showing the sealed interconnection of the inner and outer cannulas.

FIGS. 4 and 5 more clearly illustrate the method of interconnection of the two connectors 18 and 28, showing how the connectors function to provide a pneumatic seal and to align the distal ends of the inner and outer cannulas. The connector 18 includes a pair of peripherally spaced, inwardly and circumferentially extending shoulders 64 having lower camming surfaces 66. The thickness of the shoulders 64 varies with their circumferential extension so that the lower camming surfaces 66 form a pair of circumferentially inclined planes. A pair of tabs 68 on the connector 28 are inserted through the space 70 between the circumferentially extending shoulders 64 and rotated beneath the surfaces 66. This rotation against the inclined surfaces 66 forces the connector 28 into sealing contact with the connectors 18 causing the surfaces 56 and 58, as shown in FIG. 3, to form a pneumatic seal. These abutting surfaces 56 and 58 also assure proper axial alignment of the inner cannula 26 within the outer cannula 10, so that the distal ends 52 and 46 of the inner and outer cannulas 26 and 10 will be substantially flush or the inner cannula will extend up to one thirty-second of an inch beyond the outer cannula.

The inner cannula 26, outer cannula 10, and sealing balloon 12 are preferably constructed of the same non-toxic polymer material. Such uniformity permits the formation of a continuous bond between the outer cannula 10 and the sealing balloon 12 which makes these elements materially integral and thus assures a pneumatic seal therebetween.

A material which is well adapted to construction of the present tracheostomy tubes is Poly Vinyl Chloride (PVC), such as Firestone's EXON No. 654 or Borden's VC–2605, made flexible with approximately 50 percent of a plasticizer, such as dioctyl phthalate, and colored with a small percentage of pigment such as titanium dioxide. The tubes may be formed by injection molding from compounds such as MacLin's VM 2800 and VM 0400. Any conventional inert plasticizer such as the adipate plasticizers or other phthalate esters can be used. A radio opaque material such as barium sulfate may be added to the compounds to permit x-ray observation of its position. The inflation balloon is formed with a higher quantity of plasticizer to provide greater flexibility.

The PVC may be treated to prevent degradation with age by addition of a small percentage of stabilizer material such as cadmium or zinc adipates or epoxy resins.

The cannulas are injection molded. The tubing 30 is then placed in the wall of the cannula in the passage 40. For example, the cannulas may be molded as axially extending half sections which are then thermally bonded. Each of the sections is molded to have half of the passage 40 in one of its axially extending edges so that the tube 30 can be fitted therein prior to bonding the two cannula halves together. The sealing balloon may be formed by dipping a form into molten PVC. A surface activator such as polyethylene glycol may be added in small percentages to avoid surface bubbles during this dipping process.

Dielectric heating of the polyvinyl chloride may be used to bind the sealing balloon to the outer cannula. The heating fuses the surfaces of these two members into one another, thus forming a uniform integral pneumatic sealing bond. This may be accomplished with a high frequency mandrel and annular ring generator. Additionally, a plastisol may be used as a bonding agent to fix the ends of the sealing balloon to the outer cannula. The plastisol may be heat cured to form an airtight bond. The bonding agent can be produced by dissolving a portion of the PVC cannula material into a volatile solvent.

Figure 6:
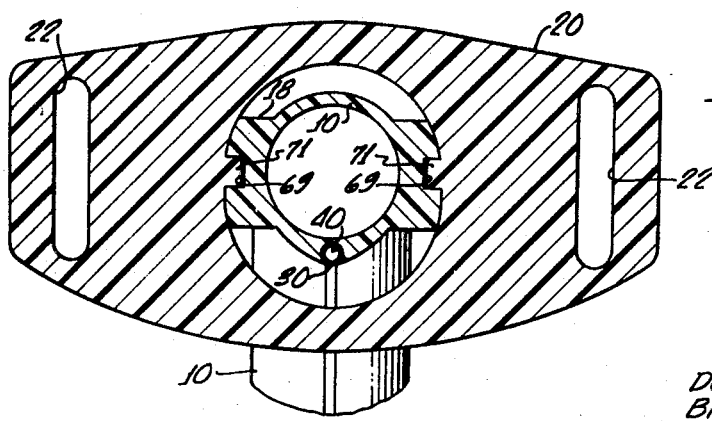
FIG. 6 is a vertical section taken substantially along the line 6—6 of FIG. 3 showing the structure for the pivotally mounted neck flange.

FIG. 6 shows the method of pivotally mounting the swivel neck flange 20, which is also preferably constructed of semi-rigid polymer material, to the connector 18. The connector 18 contains two opposing cylindrical recesses 69 into which are fitted a pair of outwardly extending dowels 71 on the neck flange 20, these dowels 71 being free to rotate within the recesses 69. This allows the swivel neck flange 20 to rotate about the outer cannula 10 through a predetermined angle, this angle being limited by contact of the neck flange 20 with the connector 18 (see FIG. 3), and sufficient to allow a flush fit of the flange 20 with the neck of most patients, and yet not allowing complete freedom of movement of the outer cannula 10. The angular rotation of the flange 20 is limited to approximately 45° (15° upward and 30° downward) so that it will not pivot to interfere with insertion of the outer cannula 10 into the patient's neck, but will permit some freedom of movement of the patient's neck.

Figure 8:
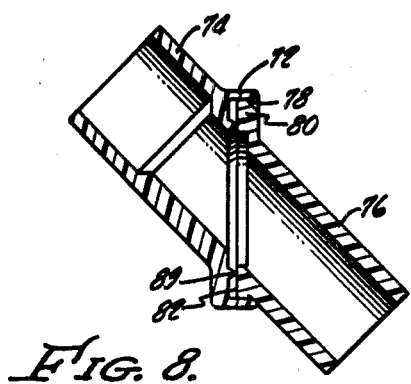
FIG. 8 is a vertical section through the swivel connector of FIG. 7 taken substantially along line 8—8 showing the outer tube swiveled to its extended position.
Figure 7:
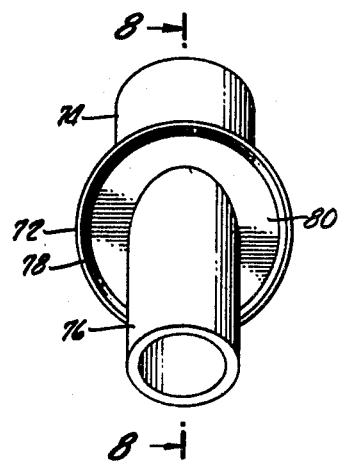
FIG. 7 is a perspective view of the swivel connector which is used to connect artificial respirator equipment to the inner cannula from variable positions.
Figure 9:
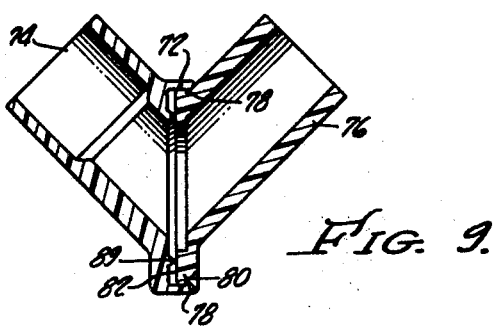
FIG. 9 is a sectional view as in FIG. 8, but with one of the connector members swiveled 180° from the position of FIG. 8 to form a right angle connection.

FIGS. 7, 8 and 9 describe the construction of a rotatable adapter 72 which may be attached to the connector 28. One end of the adapter 72 has a conical opening 74 which is designed to receive the frusto-conical fitting of connector 28 and form an airtight seal with that connector. The other end 76 of the adapter 72 is designed to be coupled with an artificial respiration device. Between these ends 74 and 76 there is a swivel connector which is offset at an angle of approximately 45° from both ends. This offset allows the tubular end 76 to be swiveled to a variety of angular locations relative to the end 74, therefore allowing the connections to the artificial respirating equipment to be made from different locations.

The swivel seal is formed by an annular lip 78 on the frustum end 74 which engages an annular tab 80 which projects from the tubular end 76. This inner connection of the lip 78 and the tab 80 allows the two pieces to swivel relative to one another while maintaining the inner surface 82 of the tab 80 in contact with a sealing ridge 84 on the frustum end 74.

The construction of the tube constricting pinch valve 36 for sealing the pressurized system which inflates the sealing balloon is best described with reference to FIG. 1. The valve 36 has a hollow cylindrical housing 86 which has the outer end 87 of the inflation tubing 34 cemented therein so that the inflation tube 34 extends axially throughout the inner bore of the housing 86. A transverse passage 88 is provided through the housing 86 intermediate one end of the housing and the point of attachment of the end 87 of the tube 34 to the inner housing bore. A cylindrically tapered clamping pin 89 is inserted into the transverse passage 88. The pin 89 has a pair of thumb operated pusher buttons 90 and 91 mounted on its opposite ends in conventional fashion for transversely moving the clamping pin 89. When the large diameter portion of the tapered pin 89 is pushed into the passage 88, the tube 34 is depressed against the internal bore of the housing 86 pinching the tubing shut. The end of the housing 86 which does not receive the tube 34 may be enlarged, as shown in FIG. 1, for receiving a hypodermic syringe to inflate the sealing balloon 12.

Figure 10:
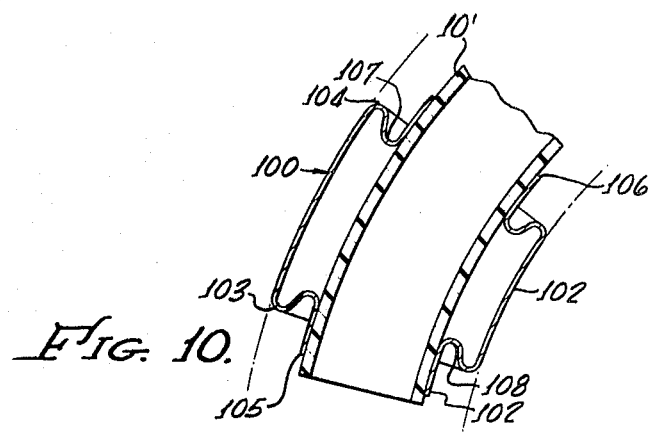
FIG. 10 is a sectional view of a flaccid sealing cuff constructed in accordance with another embodiment of this invention.

FIG. 10 shows an alternative sealing cuff 100 which may be bonded to the outer cannula 10'. The sealing cuff 100 comprises an enlarged resilient cylinder 102 which is doubled inwardly at points 103 and 104 near its opposite ends 105 and 106. The ends 105 and 106 are then folded back outwardly at 107 and 108 forming an "S" fold and their inner surfaces are bonded to the cannula 10 from the outward folds 107 and 108 to the ends. The cuff is inflated only sufficiently to make a seal between its outer surface and the tracheal lumen. The inflated cuff is a smooth wall cylinder of constant diameter. This creates a gentle seal without damaging the tracheal tissue. This embodiment enables axial movement of the cuff with respect to the cannula 10'. Thus this cuff enables slight axial motion of the cannula 10' within the trachea without irritation or damage to the tracheal tissue since when the cannula 10' is moved downward, as shown in FIG. 10, the seal between the cuff 100 and the tracheal lumen is not changed. The cuff merely unfolds at the leading end in the direction of movement. Thus movement of the cuff with respect to the trachea is a rolling movement and not a sliding movement.

Use of this tracheostomy tube offers many advantages over prior art devices. The pivotal connection of the flange 20 allows the flange 20 to be fitted flush with the neck of patients with different anatomies while still allowing the outer cannula 10 to maintain the proper position for insertion in the trachea of the patient.

The flat outer surface of the sealing balloon 12 allows the tracheostomy tube to form a good pneumatic seal with the trachea without applying a great amount of pressure to the trachea, as was required in prior art devices. Such pressure often caused necrosis of the inner tracheal tissue.

The connection of the adapter 72 to the inner cannula 26 through the connector 28 forces the user of this device to attach artificial respirator equipment only with the inner cannula in place. Since phlegm and mucous often form within the tracheal tubing, and therefore have a tendency to clog the central bore, one purpose of the inner cannula 26 is to allow cleaning of the central bore of the trachea tube without removal of the whole assembly from the patient. It is therefore advantageous to assure that the user of this device at all times maintains the inner cannula 26 in its proper position. It is also important that the end 52 of the inner cannula and the end 46 of the outer cannula remain flush with one another, as is assured by the sealed connection between the connectors 18 and 28, so that when the inner cannula is removed the total bore of the tracheostomy tube may be cleaned.

The rotatable connector 76 allows connection of the tracheostomy tube to respiration support equipment from a variety of angles to minimize discomfort to the patient and disruption of the working areas around him.

The valve 36 allows quick setting and releasing of pressure within the sealing balloon 12 to facilitate proper inflation and maintaining of the pressure within the sealing balloon 12.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A tracheostomy tube for insertion into the trachea to support breathing comprising:

a cannula having a first end for placement within said trachea and a second end for placement outside of said trachea; and inflatable sealing means for forming a seal with the tracheal wall comprising a tubular membrane coaxial with and surrounding said cannula at said first end, said membrane having two ends bonded to said cannula and having annular portions adjacent said ends which normally project radially outward from the surface of the cannula when the membrane is not inflated and which are spaced along the axis of said cannula, the uninflated diameter of said membrane being shorter midway between said projecting portions than at said portions, said membrane being constructed such that it forms a substantially cylindrical shape when inflated to thereby provide a good seal with relatively low pressure.

2. The tracheostomy tube defined in claim 1 wherein said membrane is collapsible against the outside diameter of said cannula to facilitate insertion of said cannula into the trachea.

3. The tracheostomy tube defined in claim 2 wherein variations in pneumatic pressure within said membrane are used to collapse and inflate said membrane.

4. The tracheostomy tube defined in claim 3 wherein said membrane assumes a concave shape when collapsed, and wherein said cannula and said membrane are made of the same polymer material and are integrally bonded to form a continuous material connection insuring a pneumatic seal.

5. A tracheostomy tube for insertion into the trachea to support breathing comprising a cannula having a first end for placement within the trachea and a second end for placement outside the trachea, and a second cannula, concentric with said cannula, wherein said second end of said cannula and one end of the said second cannula are connected with a pneumatically sealing fitting which is nonremovably attached to said second cannula; and a tubular sealing balloon mounted on said first end of said cannula, said sealing balloon being smaller in diameter at its midportion than near its ends in its collapsed state such that, when inflated, it presents a generally uniform, substantially cylindrical surface for sealing with the inner wall of said trachea.

6. A tracheostomy tube as defined in claim 5 further including an inflation tubing connected to said sealing balloon and extending axially along said cannula to said second end of said cannula and outside of the trachea, and further including valve means mounted on the inflation tubing for controlling inflation and deflation of said sealing balloon.

7. A tracheostomy tube as defined in claim 6 wherein said valve means comprise a hollow cylindrical housing for receiving said inflation tubing and a tapered clamping member mounted for transverse movement across said housing to open and close said inflation tubing.

8. A tracheostomy tube as defined in claim 7 wherein said housing is tapered internally at one end thereof for receiving an inflation member and the inflation tubing is fixedly attached to the inner bore of the housing intermediate the tapered end and the clamping member.

9. A tracheostomy tube for insertion into the trachea comprising:

an outer cannula, having a first end and a second end;

a first connector attached to said second end of said outer cannula;

an inner cannula adapted to fit within said outer cannula and having a first end and a second end, said inner cannula comprising a cylindrical tubing of smaller diameter than said outer cannula equal to the length of the outer cannula;

a second connector rotatably mounted on said second end of said inner cannula;

means on said first and second connectors for drawing said connectors together to form a substantially airtight seal between said second end of said inner cannula and to axially align said inner cannula within said outer cannula so that said first end of said inner cannula is substantially flush with said first end of said outer cannula;

sealing means adjacent said first end of said outer cannula for sealing said outer cannula within said trachea, said sealing means comprising a tubular membrane coaxial with said outer cannula, having a radius larger than that of the outside of said outer cannula and having two annular end portions, each of which project outwardly from the surface of said outer cannula, said two end portions separated by a finite length along the axis of said outer cannula, the uninflated diameter of the membrane between the annular portions being smaller than that of the annular portions such that the inflated membrane forms a substantially cylindrical shape;

a neck flange rotatably mounted on said first connector, said flange adapted to be strapped to the neck of a patient; and a rotatably connected, axially offset, substantially airtight tubular adapter mounted on said second connector for connection of said trachea tube to respiration support equipment from a variety of angular locations.

10. A tracheal tube for insertion in the trachea to support breathing including a cannula having a first end for placement within the trachea and a second end for placement outside of the trachea, and an improved sealing means for forming a seal to the trachea wall comprising a tubular membrane surrounding a portion of the cannula and having two ends snugly mounted on the cannula so that the membrane when inflated forms a seal with the tracheal wall, the membrane the membrane length between its ends as mounted on the cannula being greater than the distance along the cannula between the mounted ends and the membrane having a portion folded over on itself adjacent each of its mounted ends so that when inflated it enables some significant axial movement of the cannula in either direction with respect to the trachea without sliding axial movement of the sealing means.

11. The tube of claim 10 wherein the cannula is curved between its ends and the membrane between the folded portions has a substantially cylindrical exterior when inflated and unconfined.

12. The tube of claim 10 wherein said folded membrane portions extends over each of said mounted ends.

13. The tube of claim 12 wherein said folded over portions have somewhat of an S-shaped cross-section.

14. The tube of claim 10 wherein the cannula is curved between its ends and the membrane between the folded portions has a substantially cylindrical exterior when inflated and unconfined.

15. The tube of claim 10 wherein the portions of the membrane between its mounted ends has a diameter sufficiently larger than that of the cannula such that it is loosely surrounding the cannula when in an uninflated condition.

* * * * *